United States Patent
Ellul et al.

(10) Patent No.: US 7,812,093 B2
(45) Date of Patent: *Oct. 12, 2010

(54) PEROXIDE-CURED THERMOPLASTIC VULCANIZATES AND MEDICAL DEVICES MADE THEREWITH

(75) Inventors: Maria D. Ellul, Silver Lake Village, OH (US); John D. Gorsuch, Doylestown, OH (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 595 days.

This patent is subject to a terminal disclaimer.

(21) Appl. No.: 11/311,491

(22) Filed: Dec. 19, 2005

(65) Prior Publication Data

US 2007/0142554 A1   Jun. 21, 2007

(51) Int. Cl.
- *C08F 8/00* (2006.01)
- *C08L 9/00* (2006.01)
- *C08L 23/00* (2006.01)
- *C08L 33/14* (2006.01)
- *C08L 45/00* (2006.01)

(52) U.S. Cl. .................. 525/191; 525/194; 525/211; 525/232; 525/240

(58) Field of Classification Search ............... 525/191, 525/194, 211, 232, 240
See application file for complete search history.

(56) References Cited

U.S. PATENT DOCUMENTS

| | | | |
|---|---|---|---|
| 4,311,628 A | 1/1982 | Abdou-Sabet et al. | |
| 4,594,390 A | 6/1986 | Abdou-Sabet et al. | |
| 5,100,947 A | 3/1992 | Puydak et al. | |
| 5,157,081 A | 10/1992 | Puydak et al. | |
| 5,290,866 A | 3/1994 | Dobreski et al. | |
| 5,397,832 A | 3/1995 | Ellul et al. | |
| 5,656,693 A * | 8/1997 | Ellul et al. | 525/171 |
| 6,196,711 B1 | 3/2001 | Blach et al. | |
| 6,245,856 B1 | 6/2001 | Kaufman et al. | |
| 6,268,438 B1 | 7/2001 | Ellul et al. | |
| 6,288,171 B2 | 9/2001 | Finerman et al. | |
| 6,451,915 B1 | 9/2002 | Ellul et al. | |
| 6,797,779 B1 * | 9/2004 | Ajbani et al. | 525/191 |
| 6,867,260 B2 | 3/2005 | Datta et al. | |
| 2004/0082725 A1 * | 4/2004 | Mabuchi et al. | 525/326.1 |
| 2004/0176540 A1 * | 9/2004 | Nishihara | 525/192 |
| 2006/0052540 A1 | 3/2006 | Ellul et al. | |
| 2006/0293457 A1 | 12/2006 | Nadella et al. | |
| 2006/0293462 A1 * | 12/2006 | Jacob et al. | 525/240 |
| 2007/0043172 A1 * | 2/2007 | Ellul et al. | 525/192 |
| 2007/0083008 A1 * | 4/2007 | Ellul et al. | 525/192 |
| 2007/0112139 A1 * | 5/2007 | Ellul et al. | 525/192 |
| 2007/0238810 A1 * | 10/2007 | Ellul et al. | 523/200 |

FOREIGN PATENT DOCUMENTS

| | | |
|---|---|---|
| EP | 0 376 213 | 4/1990 |
| JP | 2005-220184 A | 5/2003 |
| WO | WO 2004/009327 | 1/2004 |
| WO | WO 2005/028555 | 3/2005 |

OTHER PUBLICATIONS

Ellul et al., "Crosslink Densities and Phase Morphologies in Dynamically Vulcanized TPEs," *Rubber Chemistry and Technology*, vol. 68, pp. 573-584 (1995).

* cited by examiner

*Primary Examiner*—Nathan M Nutter

(57) ABSTRACT

A method of preparing a thermoplastic vulcanizate, the method comprising dynamically vulcanizing a rubber within a blend with a thermoplastic resin, where the dynamic vulcanization is effected with a cure system that includes a free-radical cure agent and triallyl isocyanurate.

9 Claims, 1 Drawing Sheet

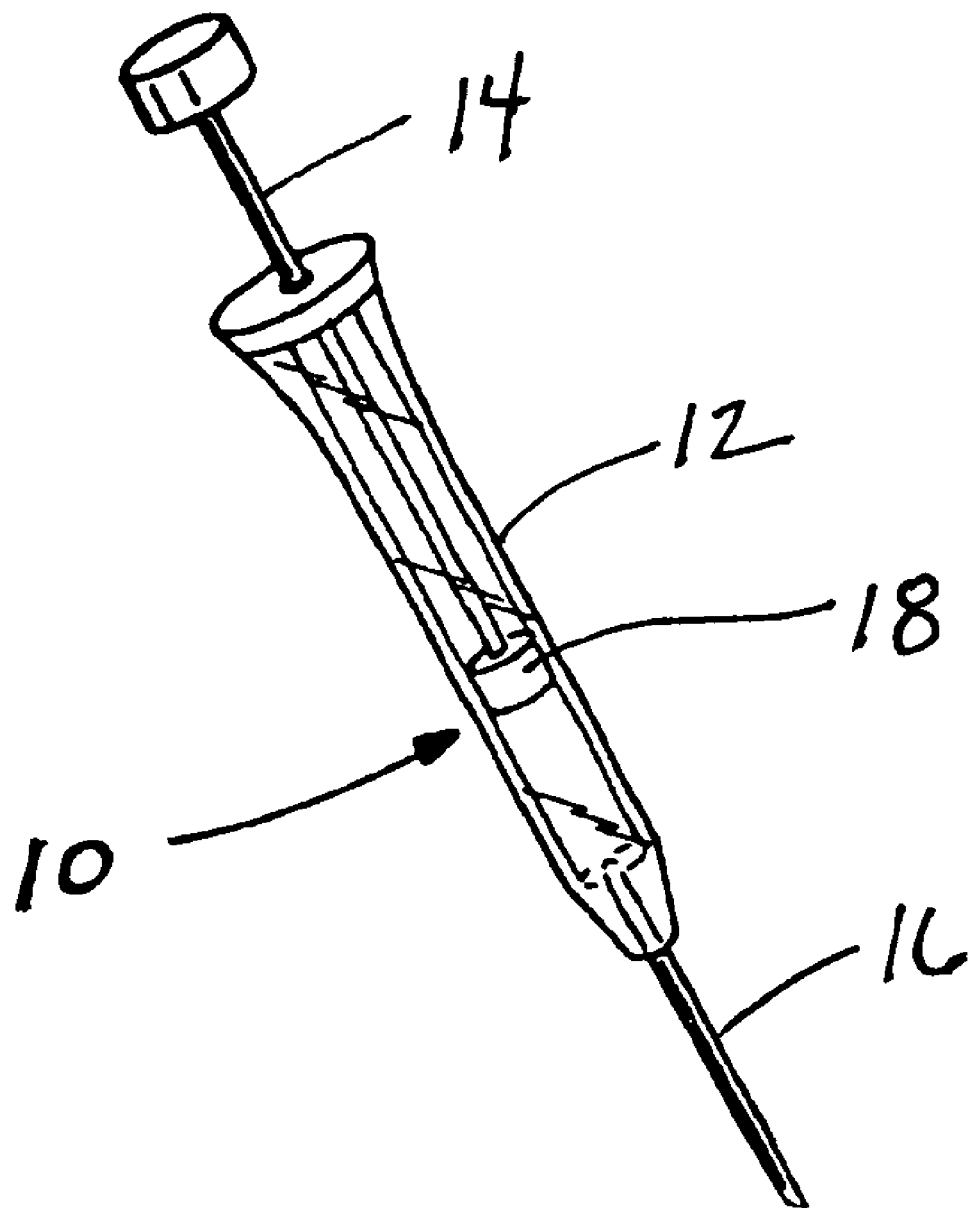
FIGURE

PEROXIDE-CURED THERMOPLASTIC VULCANIZATES AND MEDICAL DEVICES MADE THEREWITH

FIELD OF THE INVENTION

One or more embodiments of the present invention relates to peroxide-cured thermoplastic vulcanizates with reduced crystalline bloom and articles, particularly medical devices, prepared therewith.

BACKGROUND OF THE INVENTION

Thermoplastic elastomers are known. They have many of the properties of thermoset elastomers, yet they are processable as thermoplastics. One type of thermoplastic elastomer is a thermoplastic vulcanizate, which may be characterized by finely-divided rubber particles dispersed within a plastic matrix. These rubber particles are crosslinked to promote elasticity.

Thermoplastic vulcanizates may advantageously be produced by employing a peroxide cure system. Thermoplastic vulcanizates that are dynamically vulcanized with peroxide cure systems advantageously are non-hygroscopic, halide-free, lighter in color, thermally stable, and contain less residues.

For example, U.S. Pat. No. 5,656,693 teaches the use of elastomeric copolymer rubber deriving from the copolymerization of ethylene, an α-olefin, and 5-vinyl-2-norbornene. When using this particular rubber, peroxide-cured thermoplastic vulcanizates having a high degree of cure could be achieved with the use of less peroxide than had been used in the past. By employing lower levels of peroxide, those physical properties attributable to the plastic phase could be maintained. The peroxide curative may be used in conjunction with coagents such as triallyl cyanurate, triallyl isocyanurate, triallyl phosphate, sulfur, N-phenyl bis-maleamide, zinc diacrylate, zinc dimethacrylate, divinyl benzene, 1,2 polybutadiene, trimethylol propane trimethacrylate, tetramethylene glycol diacrylate, trifunctional acrylic ester, dipentaerythritolpentacrylate, polyfunctional acrylate, polyfunctional methacrylates, acrylate and methacrylate metal salts, and oximers. These thermoplastic vulcanizates may be useful for lens gaskets, food contact materials/containers, medical devices, tubing, seals, automotive components, bellows, boots, air bag door covers, instrument panel skins, and extruded profiles.

Peroxide-cured thermoplastic vulcanizates may be technologically useful in the manufacture of medical devices such as syringe seals, test tubes and other containers for medical fluids, medical tubing such as catheters, and intravenous fluid bags. Because these devices often come into contact with medical patients or bodily fluids, the ingredients within these thermoplastic vulcanizates typically must be approved for safe usage in these applications. For example, cure coagents that are currently approved for use in medical devices include triallyl cyanurate and triallyl isocyanurate. Inasmuch as triallyl cyanurate has been readily available, it is often the coagent of choice. Unfortunately, however, it has been discovered that the use of triallyl cyanurate as a coagent in peroxide-cured thermoplastic vulcanizates leads to crystalline bloom issues. In other words, one or more constituents of the thermoplastic vulcanizate migrates to the surface of the extrudate. This crystalline or crystalline bloom can be deleterious in several respects. For example, the materials that bloom to the surface could cause contamination problems when in contact with medical patients or bodily fluids. Also, this bloom can cause functional failure where the bloom may alter friction characteristics and thereby cause stick slip in medical devices such as syringe seals or container corks or stoppers. Still further, crystalline bloom can reduce optical clarity of devices such as bottles and containers, which again may be deleterious in the medical industry where the ability to optically analyze materials such as bodily fluids is important.

There is therefore a need to reduce crystalline bloom without having a deleterious impact on the physical and mechanical properties offered by peroxide-cured thermoplastic vulcanizates.

The FIGURE shows a perspective view of a syringe including a syringe seal of one embodiment of the present invention.

SUMMARY OF THE INVENTION

One or more embodiments of the present invention provides a method of preparing a thermoplastic vulcanizate, the method comprising dynamically vulcanizing a rubber within a blend with a thermoplastic resin, where the dynamic vulcanization is effected with a cure system that includes a free-radical cure agent and triallyl isocyanurate.

One or more embodiments of the present invention also provides fabricated articles of commerce such as medical devices comprising at least one molded component prepared from a thermoplastic vulcanizate including a dynamically cured rubber, where the dynamic cure of the rubber has been effected with a free-radical curative and a triallyl isocyanurate coagent.

One or more embodiments of the present invention further provides the use of triallyl isocyanurate coagents in the preparation of a thermoplastic elastomer by dynamic vulcanization with a free-radical curative of an olefinic elastomer copolymer of ethylene, at least one α-olefin monomer, and optionally at lease one diene monomer, in a blend with a thermoplastic resin for the purpose of reducing crystalline bloom in articles fabricated from the thermoplastic elastomer.

BRIEF DESCRIPTION OF THE DRAWING

FIG. 1 is a drawing of one embodiment of a medical device, in this case a syringe.

DETAILED DESCRIPTION OF ILLUSTRATIVE EMBODIMENTS

Thermoplastic vulcanizates of one or more embodiments of the present invention are prepared by dynamically curing rubber with a free-radical curative in the presence of triallyl isocyanurate. The use of triallyl isocyanurate as a coagent has unexpectedly resulted in thermoplastic vulcanizates that upon fabrication are characterized by reduced or insubstantial crystalline bloom.

In one or more embodiments, the thermoplastic vulcanizates of this invention include a dynamically-cured rubber and a thermoplastic resin. Other optional ingredients or constituents include processing additives, oils, fillers, and other ingredients that are conventionally included in thermoplastic vulcanizates.

Any rubber or mixture thereof that is capable of being dynamically cured with a peroxide cure system may be used. Reference to a rubber may include mixtures of more than one rubber. Non-limiting examples of useful rubbers include olefinic elastomeric copolymers, natural rubber, styrene-butadiene copolymer rubber, butadiene rubber, acrylonitrile rubber, butadiene-styrene-vinyl pyridine rubber, urethane rubber, polyisoprene rubber, epichlorohydrin terpolymer rubber, polychloroprene, and mixtures thereof.

The term olefinic elastomeric copolymer refers to rubbery copolymers polymerized from ethylene, at least one α-olefin monomer, and optionally at least one diene monomer. The α-olefins may include, but are not limited to, propylene, 1-butene, 1-hexene, 4-methyl-1-pentene, 1-octene, 1-decene, or combinations thereof. In one embodiment, the α-olefins include propylene, 1-hexene, 1-octene or combinations thereof. The diene monomers may include, but are not limited to, 5-ethylidene-2-norbornene; 5-vinyl-2-norbornene; divinyl benzene; 1,4-hexadiene; 5-methylene-2-norbornene; 1,6-octadiene; 5-methyl-1,4-hexadiene; 3,7-dimethyl-1,6-octadiene; 1,3-cyclopentadiene; 1,4-cyclohexadiene; dicyclopentadiene; or a combination thereof. In the event that the copolymer is prepared from ethylene, α-olefin, and diene monomers, the copolymer may be referred to as a terpolymer or even a tetrapolymer in the event that multiple α-olefins or dienes are used.

In one or more embodiments, the olefinic elastomeric copolymers include from about 12 to about 85% by weight or from about 20 to about 80% by weight, or from about 40 to about 70% by weight, and or from about 60 to about 66% by weight ethylene units deriving from ethylene monomer, and from about 0.1 to about 15% by weight, or from about 0.5 to about 12% by weight, or from about 1 to about 10% by weight, or from about 2 to about 8% by weight diene units deriving from diene monomer, with the balance including α-olefin units (such as propylene) deriving from α-olefin monomer. Expressed in mole percent, the terpolymer of one embodiment includes from about 0.1 to about 5 mole percent, or from about 0.5 to about 4 mole percent, or from about 1 to about 2.5 mole percent diene units deriving from diene monomer. In one or more embodiments, where the diene includes 5-ethylidene-2-norbornene the olefinic elastomeric copolymer may include at least 6% by weight, in other embodiments at least 8% by weight, and in other embodiments at least 10% by weight units deriving from 5-ethylidene-2-norbornene.

In one or more embodiments, useful olefinic elastomeric copolymers have a weight average molecular weight ($M_w$) that is greater than 50,000, in other embodiments greater than 100,000, in other embodiments greater than 200,000, and in other embodiments greater than 300,000; and the weight average molecular weight of the preferred olefinic elastomeric copolymers of one embodiment is less than 1,200,000, in other embodiments less than 1,000,000, in other embodiments less than 900,000, and in other embodiments less than 800,000. In one or more embodiments, useful olefinic elastomeric copolymers have a number average molecular weight ($M_n$) that is greater than 20,000, in other embodiments greater than 60,000, in other embodiments greater than 100,000, and in other embodiments greater than 150,000; and the number average molecular weight of the olefinic elastomeric copolymers of one or more embodiments is less than 500,000, in other embodiments less than 400,000, in other embodiments less than 300,000, and in other embodiments less than 250,000.

In one or more embodiments, useful olefinic elastomeric copolymers may also be characterized by having a Mooney viscosity ($ML_{(1+4)}$ at 125° C.) per ASTM D 1646, of from about 50 to about 500 or from about 75 to about 450. Where higher molecular weight olefinic elastomeric copolymers are employed within the thermoplastic vulcanizates of this invention, these high molecular weight polymers may be obtained in an oil-extended form. These oil-extended copolymers typically include from about 15 to about 100 parts by weight, per 100 parts by weight rubber, of a paraffinic oil. The Mooney viscosity of these oil-extended copolymers may be from about 45 to about 80 or from about 50 to about 70.

In one or more embodiments, useful olefinic elastomeric copolymers may be characterized by having an intrinsic viscosity, as measured in Decalin at 135° C., up from about 2 to about 8 dl/g, or from about 3 to about 7 dl/g, or from about 4 to about 6.5 dl/g.

In one embodiment, the elastomeric copolymer is a terpolymer of ethylene, at least one α-olefin monomer, and 5-vinyl-2-norbornene. This terpolymer is advantageous when a peroxide curative is employed as described in U.S. Pat. No. 5,656,693, which is incorporated herein by reference. In one or more embodiments, the terpolymer includes from about 40 to about 90 mole percent of its polymeric units deriving from ethylene, and from about 0.2 to about 5 mole percent of its polymeric units deriving from vinyl norbornene, based on the total moles of the terpolymer, with the balance comprising units deriving from α-olefin monomer. In other embodiments, the elastomeric copolymer includes from about 1 to about 8, and in other embodiments from about 2 to about 5% by weight units deriving from 5-vinyl-2-norbornene. Other useful olefinic elastomeric copolymers are disclosed in U.S. Pat. Nos. 6,268,438, 6,288,171, 6,245,856, and 6,867,260, U.S Publication No. 2005/010753, and U.S. Ser. No. 11/273,337, which are incorporated herein by reference for the purposes of U.S. patent practice.

Useful olefinic elastomeric copolymers may be manufactured or synthesized by using a variety of techniques. For example, these copolymers can be synthesized by employing solution, slurry, or gas phase polymerization techniques that employ numerous catalyst systems including Ziegler-Natta systems, single-site catalysts including vanadium catalysts and Group IV-VI metallocenes, and Brookhart catalysts. Elastomeric copolymers are commercially available under the tradenames Vistalon™ (ExxonMobil Chemical Co.; Houston, Tex.), Keltan™ (DSM Copolymers; Baton Rouge, La.), Nordel™ IP (Dow Chemical Company), NORDEL MG™ (Dow Chemical Company), Royalene™ (Crompton) and Buna™ (Lanxess).

In one or more embodiments the rubber can be highly cured. In one embodiment, the rubber is advantageously completely or fully cured. The degree of cure can be measured by determining the amount of rubber that is extractable from the thermoplastic vulcanizate by using cyclohexane or boiling xylene as an extractant. This method is disclosed in U.S. Pat. No. 4,311,628, which is incorporated herein by reference for purpose of U.S. patent practice. In one embodiment, the rubber has a degree of cure where not more than 10 weight percent, in other embodiments not more than 6 weight percent, in other embodiments not more than 5 weight percent, and in other embodiments not more than 3 weight percent is extractable by cyclohexane at 23° C. as described in U.S. Pat. Nos. 5,100,947 and 5,157,081, which are incorporated herein by reference for purpose of U.S. patent practice. Alternatively, in one or more embodiments, the rubber has a degree of cure such that the crosslink density is preferably at least $4 \times 10^{-5}$, in other embodiments at least $7 \times 10^{-5}$, and in other embodiments at least $10 \times 10^{-5}$ moles per milliliter of rubber. See also "Crosslink Densities and Phase Morphologies in Dynamically Vulcanized TPEs," by Ellul et al., RUBBER CHEMISTRY AND TECHNOLOGY, Vol. 68, pp. 573-584 (1995).

Any thermoplastic resin that can be employed in the manufacture of thermoplastic vulcanizates can be used to manufacture the thermoplastic vulcanizates of this invention. Useful thermoplastic resins include solid, generally high molecular weight plastic resins. These resins include crystalline and semi-crystalline polymers including those having a crystallinity of at least 25% as measured by differential scanning calorimetry. Selection of particular resins may include those that have a melt temperature lower than the decomposition temperature of the rubber selected.

In one or more embodiments, useful thermoplastic resins may be characterized by an $M_w$ of from about 200,000 to about 2,000,000 and in other embodiments from about 300,000 to about 600,000. They are also characterized by an $M_n$ of about 80,000 to about 800,000, and in other embodiments about 90,000 to about 150,000, as measured by GPC with polystyrene standards.

In one or more embodiments, these thermoplastic resins can have a melt flow rate that is less than about 10 dg/min, in other embodiments less than about 2 dg/min, in other embodiments less than about 1.0 dg/min, and in other embodiments less than about 0.5 dg/min, per ASTM D-1238 at 230° C. and 2.16 kg load.

In one or more embodiments, these thermoplastic resins also can have a melt temperature ($T_m$) that is from about 150° C. to about 250° C., in other embodiments from about 155° C. to about 170° C., and in other embodiments from about 160° C. to about 165° C. They may have a glass transition temperature ($T_g$) of from about −10° C. to about 10° C., in other embodiments from about −3° C. to about 5° C., and in other embodiments from about 0° C. to about 2° C. In one or more embodiments, they may have a crystallization temperature ($T_c$) of these optionally at least about 75° C., in other embodiments at least about 95° C., in other embodiments at least about 100° C., and in other embodiments at least 105° C., with one embodiment ranging from 105° C. to 115° C.

Also, these thermoplastic resins may be characterized by having a heat of fusion of at least 25 J/g, in other embodiments in excess of 50 μg, in other embodiments in excess of 75 J/g, in other embodiments in excess of 95 J/g, and in other embodiments in excess of 100 J/g.

Exemplary thermoplastic resins include crystalline and crystallizable polyolefins. Also, the thermoplastic resins may include copolymers of polyolefins with styrene such as styrene-ethylene copolymer. In one embodiment, the thermoplastic resins are formed by polymerizing ethylene or α-olefins such as propylene, 1-butene, 1-hexene, 1-octene, 2-methyl-1-propene, 3-methyl-1-pentene, 4-methyl-1-pentene, 5-methyl-1-hexene, and mixtures thereof. Copolymers of ethylene and propylene and ethylene and/or propylene with another α-olefin such as 1-butene, 1-hexene, 1-octene, 2-methyl-1-propene, 3-methyl-1-pentene, 4-methyl-1-pentene, 5-methyl-1-hexene or mixtures thereof is also contemplated. Specifically included are the reactor, impact, and random copolymers of propylene with ethylene or the higher α-olefins, described above, or with $C_{10}$-$C_{20}$ diolefins. Comonomer contents for these propylene copolymers will typically be from 1 to about 30% by weight of the polymer, for example, See U.S. Pat. Nos. 6,268,438, 6,288,171, 6,867,260 B2, 6,245,856, and U.S. Publication No. 2005/010753, which are incorporated herein by reference. Copolymers available under the tradename VISTAMAXX™ (ExxonMobil) are specifically included. Blends or mixtures of two or more polyolefin thermoplastics such as described herein, or with other polymeric modifiers, are also suitable in accordance with this invention. These homopolymers and copolymers may be synthesized by using an appropriate polymerization technique known in the art such as, but not limited to, the conventional Ziegler-Natta type polymerizations, and catalysis employing single-site organometallic catalysts including, but not limited to, metallocene catalysts.

In one embodiment, the thermoplastic resin includes a high-crystallinity isotactic or syndiotactic polypropylene. This polypropylene can have a density of from about 0.85 to about 0.91 g/cc, with the largely isotactic polypropylene having a density of from about 0.90 to about 0.91 g/cc. Also, high and ultra-high molecular weight polypropylene that has a fractional melt flow rate can be employed. These polypropylene resins are characterized by a melt flow rate that is less than or equal to 10 dg/min, optionally less than or equal to 1.0 dg/min, and optionally less than or equal to 0.5 dg/min per ASTM D-1238 at 2.16 kg load.

In one embodiment, the thermoplastic resin includes a propylene copolymer deriving from the copolymerization of monomer including i) propylene, ii) an α, internal non-conjugated diene monomer, iii) optionally an α, ω non-conjugated diene monomer, and iv) optionally ethylene, or a propylene copolymer deriving from the copolymerization of monomer including i) propylene, ii) an olefin containing a labile hydrogen, and iii) optionally ethylene. These propylene copolymers are disclosed in U.S. Ser. No. 10/938,369, which is incorporated herein by reference. These propylene copolymers can be used as the sole thermoplastic component, or they may be used in conjunction with other thermoplastic resins including those described herein.

In certain embodiments, the thermoplastic vulcanizate may include a polymeric processing additive. The processing additive may be a polymeric resin that has a very high melt flow index. These polymeric resins include both linear and branched polymers that have a melt flow rate that is greater than about 500 dg/min, more preferably greater than about 750 dg/min, even more preferably greater than about 1000 dg/min, still more preferably greater than about 1200 dg/min, and still more preferably greater than about 1500 dg/min. Mixtures of various branched or various linear polymeric processing additives, as well as mixtures of both linear and branched polymeric processing additives, can be employed. Reference to polymeric processing additives can include both linear and branched additives unless otherwise specified. Linear polymeric processing additives include polypropylene homopolymers, and branched polymeric processing additives include diene-modified polypropylene polymers. Thermoplastic vulcanizates that include similar processing additives are disclosed in U.S. Pat. No. 6,451,915, which is incorporated herein by reference for purpose of U.S. patent practice.

In one or more embodiments, the thermoplastic vulcanizates may include a mineral oil, a synthetic oil, or a combination thereof. These oils may also be referred to as plasticizers or extenders. Mineral oils may include aromatic, naphthenic, paraffinic, and isoparaffinic oils. In one or more embodiments, the mineral oils may be treated or untreated. Useful mineral oils can be obtained under the tradename SUNPAR™ (Sun Chemicals). Others are available under the name PARALUX™ (Chevron).

In one or more embodiments, synthetic oils include polymers and oligomers of butenes including isobutene, 1-butene, 2-butene, butadiene, and mixtures thereof. In one or more embodiments, these oligomers include isobutenyl mer units. In one or more embodiments, these oligomers can be characterized by a number average molecular weight ($M_n$) of from about 300 to about 9,000 g/mole, and in other embodiments from about 700 to about 1,300 g/mole. Exemplary synthetic oils include polyisobutylene, poly(isobutylene-co-butene), polybutadiene, poly(butadiene-co-butene), and mixtures thereof. In one or more embodiments, synthetic oils may include polylinear α-olefins, polybranched α-olefins, hydrogenated polyalphaolefins, and mixtures thereof; these synthetic oils may yield improved low temperature performance.

In one or more embodiments, the synthetic oils include synthetic polymers or copolymers having a viscosity in excess of about 20 cp, in other embodiments in excess of about 100 cp, and in other embodiments in excess of about 190 cp, where the viscosity is measured by a Brookfield viscometer according to ASTM D-4402 at 38° C.; in these or other embodiments, the viscosity of these oils can be less than 4,000 cp and in other embodiments less than 1,000 cp.

Useful synthetic oils can be commercially obtained under the tradenames Polybutene™ (Soltex; Houston, Tex.), Indopol™ (BP; Great Britain), and Parapol™ (ExxonMobil). White synthetic oil is available under the tradename SPECTRASYN™ (ExxonMobil), formerly SHF Fluids (Mobil). Oligomeric copolymers deriving from butadiene and its comonomers are commercially available under the tradename Ricon Resin™ (Sartomer).

In one or more embodiments, the extender oils may include organic esters, alkyl ethers, or combinations thereof including those disclosed in U.S. Pat. Nos. 5,290,866 and 5,397,832, which are incorporated herein by reference. In one or more embodiments, the organic esters and alkyl ether esters may have a molecular weight that is generally less than about 10,000. In one or more embodiments, suitable esters include monomeric and oligomeric materials having an average molecular weight of below about 2,000 and in other embodiments below about 600. In one or more embodiments, the esters may be compatible or miscible with both the polyalphaolefin and rubber components of the composition; i.e., they may mix with other components to form a single phase. In one or more embodiments, the esters include aliphatic mono- or diesters, or alternatively oligomeric aliphatic esters or alkyl ether esters. In one or more embodiments, the thermoplastic vulcanizates are devoid of polymeric aliphatic esters and aromatic esters, as well as phosphate esters.

In addition to the rubber, thermoplastic resins, and optional processing additives, the thermoplastic vulcanizates of the invention may optionally include reinforcing and non-reinforcing fillers, antioxidants, stabilizers, rubber processing oil, lubricants, antiblocking agents, anti-static agents, waxes, foaming agents, pigments, flame retardants and other processing aids known in the rubber compounding art. These additives can comprise up to about 50 weight percent of the total composition. Fillers and extenders that can be utilized include conventional inorganics such as calcium carbonate, clays, silica, talc, titanium dioxide, carbon black and the like.

In one or more embodiments, the thermoplastic vulcanizates of this invention contain a sufficient amount of the rubber to form rubbery compositions of matter. The skilled artisan will understand that rubbery compositions of matter include those that have ultimate elongations greater than 100 percent, and that quickly retract to 150 percent or less of their original length within about 10 minutes after being stretched to 200 percent of their original length and held at 200 percent of their original length for about 10 minutes.

Thus, in one or more embodiments, the thermoplastic vulcanizates can include at least about 25 percent by weight, in other embodiments at least about 45 percent by weight, in other embodiments at least about 65 percent by weight, and in other embodiments at least about 75 percent by weight rubber. In these or other embodiments, the amount of rubber within the thermoplastic vulcanizates can be from about 15 to about 90 percent by weight, in other embodiments from about 45 to about 85 percent by weight, and in other embodiments from about 60 to about 80 percent by weight, based on the entire weight of the rubber and thermoplastic combined.

In one or more embodiments, the amount of thermoplastic resin within the thermoplastic vulcanizates can be from about 15 to about 85% by weight, in other embodiments from about 20 to about 75% by weight, based on the entire weight of the rubber and thermoplastic combined. In these or other embodiments, the thermoplastic vulcanizates can include from about 15 to about 25, and in other embodiments from about 30 to about 60, and in other embodiments from about 75 to about 300 parts by weight thermoplastic resin per 100 parts by weight rubber.

When employed, the thermoplastic vulcanizates may include from about 0 to about 20 parts by weight, or from about 1 to about 10 parts by weight, or from about 2 to about 6 parts by weight of a polymeric processing additive per 100 parts by weight rubber.

Fillers, such as carbon black or clay, may be added in amount from about 10 to about 250, per 100 parts by weight of rubber. The amount of carbon black that can be used depends, at least in part, upon the type of carbon black and the amount of extender oil that is used.

Generally, from about 5 to about 300 parts by weight, or from about 30 to about 250 parts by weight, or from about 70 to about 200 parts by weight, of extender oil per 100 parts rubber can be added. The quantity of extender oil added depends upon the properties desired, with the upper limit depending upon the compatibility of the particular oil and blend ingredients; this limit is exceeded when excessive exuding of extender oil occurs. The amount of extender oil depends, at least in part, upon the type of rubber. High viscosity rubbers are more highly oil extendable. Where ester plasticizers are employed, they are generally used in amounts less than about 250 parts, or less than about 175 parts, per 100 parts rubber.

In the process of the invention, the rubber is cured or crosslinked by dynamic vulcanization. Dynamic vulcanization includes a vulcanization or curing process for a rubber within a blend with a thermoplastic resin, where the rubber may be crosslinked or vulcanized under conditions of high shear at a temperature above the melting point of the thermoplastic. In one embodiment, the rubber can be simultaneously crosslinked and dispersed as fine particles within the thermoplastic matrix, although other morphologies may also exist.

In one or more embodiments, dynamic vulcanization can be effected by employing a continuous process. Continuous processes may include those processes where dynamic vulcanization of the rubber is continuously achieved, thermoplastic vulcanizate product is continuously removed or collected from the system, and/or one or more raw materials or ingredients are continuously fed to the system during the time that it may be desirable to produce or manufacture the product.

In one or more embodiments, continuous dynamic vulcanization can be effected within a continuous mixing reactor, which may also be referred to as a continuous mixer. Continuous mixing reactors may include those reactors that can be continuously fed ingredients and that can continuously have product removed therefrom. Examples of continuous mixing reactors include twin screw extruders, multi-screw extruders (e.g., ring extruder including those described in WO 2004/009327A1, U.S. Pat. No. 6,196,711 and U.S. Publication No. 2004/01405 A1), or mega compounders. These reactive extruders may be equipped with two lobe or multi-lobe mixing blades or paddles, which may also be referred to as elements. These continuous mixing reactors may also be characterized by a length over diameter (L/D) that is greater than 30, in other embodiments greater than 40, and in other embodiments greater than 50, with particular embodiments having a length over diameter of from about 45 to 60. Also, these continuous mixing reactors may be characterized by a barrel diameter that may be from about 25 to about 360 mm, in other embodiments from about 35 to about 300 mm, and in other embodiments from about 50 to about 250 mm. Continuous mixers are commercially available from sources such as Coperion, Leistritz, Berstorff, Japan Steel Works, Blach Verfahrenstechnik GmbH, and 3+Extruder GmbH (Laufen, Germany.

In one or more embodiments, these continuous mixing reactors may be operated at shear rates in excess of $1,000\ s^{-1}$, in other embodiments in excess of $2,000\ s^{-1}$, and in other embodiments in excess of $4,500\ s^{-1}$. In these or other embodiments, sufficient shear rates can be achieved with multi-lobe mixing blades operated at about 200 to about 400 rpm, and in other embodiments at about 250 to about 350 rpm. Or, where two-lobe mixing blades are employed at 300 to about 1,200 rpm, and in other embodiments from about 400 to about 1,000 rpm. Methods for continuously preparing thermoplastic vulcanizates are described in U.S. Pat. Nos. 4,311,628, 4,594,390, and 5,656,693, and U.S. Ser. No. 11/167,339, which are incorporated herein by reference for purpose of U.S. patent practice; although methods employing low shear rates can also be used. The temperature of the blend as it passes through the various barrel sections or locations of a continuous reactor can be varied as is known in the art. In particular, the temperature within the cure zone may be controlled or manipulated according to the half-life of the curative employed. Multiple step continuous processes can also be employed whereby ingredients such as plastics, oils, and scavengers can be added after dynamic vulcanization has been achieved as disclosed in International Application No. PCT/US04/30517 (International Publication No. WO 2005/028555), which is incorporated herein by reference for purpose of U.S. patent practice.

In one or more embodiments, the cure system employed in practicing this invention includes a free-radical cure agent and a coagent. Free-radical cure agents include peroxides such as organic peroxides. Examples of organic peroxides include, but are not limited to, di-tert-butyl peroxide, dicumyl peroxide, t-butylcumyl peroxide, α,α-bis(tert-butylperoxy) diisopropyl benzene, 2,5-dimethyl-2,5-di(t-butylperoxy) hexane (DBPH), 1,1-di(tert-butylperoxy)-3,3,5-trimethyl cyclohexane, n-butyl-4-4-bis(tert-butylperoxy)valerate, benzoyl peroxide, lauroyl peroxide, dilauroyl peroxide, 2,5-dimethyl-2,5-di(tert-butylperoxy)hexyne-3, and mixtures thereof. Also, diaryl peroxides, ketone peroxides, peroxydicarbonates, peroxyesters, dialkyl peroxides, hydroperoxides, peroxyketals and mixtures thereof may be used. Useful peroxides and their methods of use in dynamic vulcanization of thermoplastic vulcanizates are disclosed in U.S. Pat. No. 5,656,693, which is incorporated herein by reference for purpose of U.S. patent practice.

As noted above, the free-radical cure agent is used in conjunction with a triallyl isocyanurate coagent. Triallyl isocyanurate may be defined by $C_{12}H_{15}N_3O_3$ or CAS Number 1025-15-6, and may have a boiling point of 144° C., a vapor pressure of 3 mm Hg, a specific gravity of about 1.15 to about 1.17 at 30° C., and a melting point of about 23° C. to about 27° C. As those skilled in the art appreciate, triallyl isocyanurate is available from numerous sources.

The triallyl isocyanurate coagent may be employed in its neat form (e.g., as a neat liquid) or together with a carrier such as a powdered liquid dispersion, which may also be referred to as a coagent wetted carrier or powdered liquid concentrate. Coagent wetted carriers include those described in U.S. Ser. No. 11/246,773, which is incorporated herein by reference.

In one or more embodiments, the carrier includes a solid material; i.e., materials that are solids at standard conditions. The solids may include particulate materials. In one or more embodiments, these solids may include those compounds that, in the absence of the coagent, would be non-reactive with respect to the other ingredients or constituents of the thermoplastic vulcanizate. In one or more embodiments, the carrier is non-acidic; in these or other embodiments, the carrier may be treated to reduce acidity.

In one or more embodiments, the carrier may include silica, silicates, or a combination thereof. Silica may include precipitated silica, amorphous fumed silica, fused silica, silica gel, and/or mixtures thereof. Silicates may include those compounds containing silicon, oxygen, and one or more metals with or without hydrogen. Both synthetic and naturally occurring silicates may be used in one or more embodiments. Examples of naturally occurring silicates include gemstones, berly, asbestos, talc, clays, feldspar, mica, and mixtures thereof. An example of a synthetic silicate includes sodium silicate. Examples of silicates include tetracalcium aluminoferrate, tricalcium silicate, dicalcium silicate, calcium metasilicate, and mixtures thereof. Other useful silicates include hydrated aluminum silicates, which may also be referred to as clays. Exemplary clays include kaolinite, montmorillonite, atapulgite, illite, bentonite, halloysite, and mixtures thereof. Still other useful silicates include hydrated magnesium silicates, which may be referred to as talcs. Exemplary talcs include talcum, soapstone, steatite, cerolite, magnesium talc, steatite-massive, and mixtures thereof.

In one or more embodiments, the carrier may be characterized by a particle size (i.e., average diameter) of from about 100 Å to about 100 nm, in other embodiments from about 0.1 μm to about 10 μm, and in other embodiments form about 2 μm to about 5 μm.

The combination of coagent and carrier may be referred to as a coagent-wetted carrier or as a powdered liquid dispersion. In one or more embodiments, the combination of coagent and carrier may include a physical blend of a liquid coagent and carrier. In these or other embodiments, the coagent and carrier may be intimately mixed to form a free flowing powder.

In one or more embodiments, the concentration of coagent on the coagent-wetted carrier may be from about 25% to about 80% by weight, in other embodiments from about 50% to about 70% by weight, and in other embodiments form about 55% to about 65% by weight based upon the total weight of the coagent-wetted carrier.

Coagent-wetted carriers including triallyl isocyanurate and amorphous silicon dioxide are commercially available under the trade name PLC(TAIC)-72 (Rhein Chemie).

In addition to the triallyl isocyanurate coagent, a complementary coagent may be used as a neat liquid or together with a carrier. Useful complementary coagents may include multi-functional acrylates, multi-functional methacrylate coagents, high-vinyl polydiene or polydiene copolymer, triallylcyanurate, triallyl phosphate, sulfur, N,N'-m-phenylenedimaleimide, N,N'-p-phenylenedimaleimide, divinyl benzene, trimethylol propane trimethacrylate, tetramethylene glycol diacrylate, trifunctional acrylic ester, dipentaerythritolpentacrylate, polyfunctional acrylate, retarded cyclohexane dimethanol diacrylate ester, polyfunctional methacrylates, acrylate and methacrylate metal salts, or oximers such as quinone dioxime.

The skilled artisan will be able to readily determine a sufficient or effective amount of curative and/or coagent to be employed without undue calculation or experimentation.

For example, where a di-functional peroxide is employed, the peroxide can be employed in an amount from about $1 \times 10^{-5}$ moles to about $1 \times 10^{-1}$ moles, optionally from about $1 \times 10^{-4}$ moles to about $9 \times 10^{-2}$ moles, and optionally from about $1 \times 10^{-2}$ moles to about $4 \times 10^{-2}$ moles per 100 parts by weight rubber. Those skilled in the art will be able to readily calculate the number of moles that would be useful for other peroxide based upon this teaching; for example, more peroxide might be useful for monofunctional peroxide compounds, and less peroxide might be useful where peroxides having greater functionality are employed. The amount may also be expressed as a weight per 100 parts by weight rubber. This amount, however, may vary depending on the curative employed. For example, where 4,4-bis(tert-butyl peroxy)diisopropyl benzene is employed, the amount employed may include from about 0.5 to about 12 and optionally from about 1 to about 6 parts by weight per 100 parts by weight rubber.

In one or more embodiments, the amount of triallyl isocyanurate coagent employed may be from about 1 to about 12 parts by weight, in other embodiments from about 2 to about 6 parts by weight, and in other embodiments from about 3 to about 4 parts by weight triallyl isocyanurate per 100 parts by weight rubber.

Despite the fact that the rubber may be partially or fully cured, the compositions of this invention can be processed and reprocessed by conventional plastic processing techniques such as extrusion, injection molding, blow molding, and compression molding. The rubber within these thermoplastic elastomers can be in the form of finely-divided and well-dispersed particles of vulcanized or cured rubber within a continuous thermoplastic phase or matrix. In other embodiments, a co-continuous morphology or a phase inversion can be achieved. In those embodiments where the cured rubber is in the form of finely-divided and well-dispersed particles within the thermoplastic medium, the rubber particles can have an average diameter that is less than 50 µm, optionally less than 30 µm, optionally less than 10 µm, optionally less than 5 µm, and optionally less than 1 µm. In certain embodiments, at least 50%, optionally at least 60%, and optionally at least 75% of the particles have an average diameter of less than 5 µm, optionally less than 2 µm, and optionally less than 1 µm.

Articles or devices, particularly medical devices, prepared from the thermoplastic vulcanizates of one or more embodiments of the present invention may be characterized by reduced or insubstantial crystalline bloom. In one or more embodiments, the surface of the articles fabricated from the thermoplastic vulcanizates of this invention include less crystalline bloom than can be detected without optical magnification after 60 days, in other embodiments after 90 days, and in other embodiments after 120 days at standard conditions. In other embodiments, the surface of the articles fabricated from the thermoplastic vulcanizates of this invention include less bloom than can be detected by a low-powered microscope, using oblique light, after 60 days, in other embodiments after 90 days, and in other embodiments after 120 days at standard conditions. In other embodiments, the articles fabricated from the thermoplastic vulcanizates of this invention insubstantial crystalline bloom, which may include less bloom than would otherwise have an appreciable impact on the surface of the article. In other embodiments, the thermoplastic vulcanizates of this invention include less crystalline bloom or material giving rise to crystalline bloom than can be detected, or in other embodiments within 1 percent, or in other embodiments within 3 percent of the detection limit, on a sample analyzed by an extraction method using gas chromatography/mass spectrometry (GC/MS) analysis. In one or more embodiments, an extraction method may include extracting a sample in methylene chloride, analyzing the sample extract by GC/MS, calculating the area of the various peaks obtained by the analysis, normalizing the various peaks, and determining the relative area of the peak or peaks attributable to material giving rise to crystalline bloom.

In one or more embodiments, the thermoplastic vulcanizates of this invention can be fabricated into articles, components, or devices that are free of crystalline bloom. These articles can be prepared by molding, extrusion, blow-molding or foaming. These articles, which are advantageously characterized by reduced or insubstantial crystalline bloom, may include lens gaskets, food contact materials/containers (e.g., baby food jar seals), medical devices, tubing, seals, automotive components, bellows, boots, air bag door covers, instrument panel skins, and extruder profiles. Medical devices prepared from the thermoplastic vulcanizates of this invention are particularly advantageous. These devices may include syringe seals, medical tubing, catheters, intravenous (IV) fluid bags, stoppers for various medical containers including vials and medical jar seals.

In one embodiment the thermoplastic vulcanizates of this invention are advantageously employed in the manufacture of syringe seals having reduced or insubstantial crystalline bloom. As a result, the surface characteristics of the syringe seals are minimally altered or not altered at all. This results in syringes that advantageously have minimal or no functional failure resulting from the frictional attributes of the seal. In one or more embodiments, syringes, including syringe seals, prepared from thermoplastic vulcanizates are characterized by minimal or no stick slip. One or more syringe devices including a syringe seal prepared from thermoplastic vulcanizates of this invention may be represented by the FIGURE. Syringe 10 includes cylindrical body 12, plunger 14, optional hollow needle 16, and syringe seal 18.

In order to demonstrate the practice of the present invention, the following examples have been prepared and tested. The examples should not, however, be viewed as limiting the scope of the invention. The claims will serve to define the invention.

EXAMPLES

Samples 1-4

Four thermoplastic vulcanizates were prepared by dynamically vulcanizing an elastomeric copolymer within a Brabender mixer. Dynamic vulcanization was achieved by using a peroxide cure system. Samples 1 and 2 employed triallyl cyanurate as a coagent, and Samples 3 and 4 employed triallyl isocyanurate as a coagent.

The ingredients included 100 parts by weight of elastomeric copolymer (this amount refers only to the rubber component even though the stock included 100 parts by weight rubber and 100 parts by weight oil), 3 parts by weight antioxidant, 6.5 parts by weight peroxide curative, 56 parts by weight thermoplastic polymer, 125 total parts by weight paraffinic oil (125 parts including the 100 parts inclusive with the rubber), 42 parts by weight clay.

The elastomeric copolymer was poly(ethylene-co-propylene-co-vinyl norbornene) characterized by having a diene content of about 3 weight percent, a Mooney viscosity $ML_{(1+4)}@125°$ C. of about 50 (oil extended), an ethylene content of about 63 weight percent, and an oil content of 100 phr, although as described above, the parts by weight rubber disclosed above simply refers to the amount of rubber even though the rubber stock included an oil. The peroxide was 2,5-dimethyl-2,5-di(t-butylperoxy)hexane obtained under the tradename DBPH PAR 100™ (Rhein Chemie); this peroxide was 50% active in paraffinic oil which refers to the fact that the ingredient included 50% by weight of the active peroxide compound and 50% by weight paraffinic oil. The thermoplastic resin was characterized by MFR 0.7 dg/min. The antioxidant was tetrakis(methylene 3,5-ditert-butyl-4 hydroxy hydrocinnamate)methane obtained under the tradename IRGANOX™ 1010 (Ciba Geigy). The triallyl cyanurate that was used was provided together with a carrier as a powdered liquid concentrate; this powdered liquid concentrate was 50% active (i.e., included 50% by weight triallyl cyanurate), the carrier was calcium silicate, which is an inert mineral filler, and concentrate was obtained under the tradename PCL™ (TAC)-50BC (Rhein Chemie). The triallyl isocyanurate was employed as a neat liquid.

The amount of coagent employed in each sample is set forth in Table I. Also provided in Table I are the results of various tests that were conducted on the samples following dynamic vulcanization. The amounts provided in Table I, as well as other Tables in this specification, are provided in parts by weight per 100 parts by weight rubber (phr) unless otherwise specified. The thermoplastic vulcanizates that are comparative samples have been designated with the letter "C" and those that are within the invention have been labeled with the letter "I."

TABLE I

| | Sample | | | |
|---|---|---|---|---|
| | 1 | 2 | 3 | 4 |
| Comparative/Invention | C | C | I | I |
| Coagent | | | | |
| Triallyl Cyanurate (w/carrier) | 6.6 | 6.6 | — | — |
| Triallyl Isocyanurate (neat) | — | — | 6.6 | 6.6 |
| Properties | | | | |
| Shore A (ISO) | 65 | 65 | 65 | 64 |
| Shore A (ASTM) | 63 | 63 | 64 | 64 |
| UTS (MPa) | 6.19 | 6.08 | 6.05 | 6.43 |
| UE % | 278 | 299 | 274 | 304 |
| M100 (MPa) | 3.18 | 2.96 | 3.08 | 2.99 |
| Wt. Gain %; 121° C. @ 24 hrs | 96 | 99 | 90 | 91 |
| Tension Set (%) | 8 | 8 | 8 | 8 |
| Compression Set (%), 1wk @ 100 C. | 36 | 35 | 34 | 34 |
| LCR Viscosity, Pa s @ 204 C., 1200 1/s | 88 | 88 | 87 | 86 |
| Die Swell, (%) | 0-13 | 0-11 | 0-11 | 4-11 |
| Crystalline Bloom (visual analysis) | Yes | Yes | No | No |
| Crystalline Bloom (GC/MS) | | | | |
| Crystalline Material (Rel. Peak Area) | 5.6 | 6.3 | 1.1 | 1.1 |
| TAC (Rel. Peak Area) | 4.1 | 4.5 | 0.9 | 1.2 |
| TAIC (Rel. Peak Area) | 5.6 | 12.4 | 32.0 | 33.7 |

Shore hardness was determined according to ISO 868 and ASTM D-2240. Ultimate tensile strength, ultimate elongation, and 100% modulus were determined according to ASTM D-412 at 23° C. by using an Instron testing machine. Weight gain was determined according to ASTM D-471. Tension set and compression set were determined according to ASTM D-142. LCR capillary viscosity was determined with a Dynisco™ Capillary Rheometer at 30:1 L/D at 1200 $s^{-1}$. Die swell was determined by a laser device.

Crystalline bloom was initially determined by analyzing each sample with a low-powered optical microscope in oblique light after each sample was stored at standard conditions for about two weeks. The results of this analysis are reported in Table I as visual inspection. Then, each sample was analyzed by using an extraction method that employed a gas chromatography/mass spectrometry (GC/MS) method. This method included the following. Plaques of the thermoplastic vulcanizate (TPV) materials were first cut into small pieces (about 2 mm×2 mm). The sample extract of the TPV materials for GC/MS analysis were prepared by weighing out 0.3 grams of each material in 4 ml screw cap vials, pipetting into each vial 2 ml of methylene chloride (MC), and sealing the vials with Teflon lined screw caps. Samples were allowed to extract for about 1 hour (with occasional shaking) before analysis of the MC solution. The sample extracts 1 were analyzed on a Thermo Finnigan Polaris GCQ Plus GC/MS system using a 30 meter Restek RTX-SMS capillary column (0.25 mm ID/0.25 micrometers df; Catalog # 12623) (Restek, Bellefonte, Pa.). GC conditions were: Injector at 180° C.; Column temperature program: 100° C. for 1 minute, 100° C. to 300° C. at 20° C./minute, hold at 300° C. for 10 minutes; Injection volumes were 1 microliters. The MS was run in the electron ionization (70 eV) mode with a source temperature of 200° C., a delayed start of 4 minutes, and a scanned mass range of 50-650 amu. The GC/MS transfer line was at 250° C. The relative retention times (RRTs) of the TAC and TAIC were determined by analyzing reference samples of these materials. The RRT of the crystalline material was determined by analyzing pure crystalline samples that had been isolated and collected using a Light Optical Microscope. The GC/MS system analysis software was used to calculate the areas of the peaks of the components of interest. The peak areas were normalized by dividing the areas by 1000. The values reported in Table I include the relative peak areas for the target materials. It is noted that the peak relating to crystalline material (which is the material believed to give rise to crystalline bloom) was determined by analysis of samples that included crystalline bloom.

The data in Table I shows that useful peroxide-cured thermoplastic vulcanizates can be prepared by employing both triallyl cyanurate and triallyl isocyanurate. Indeed, the physical and mechanical properties for Samples 1-4 are comparable. Significantly, however, those samples prepared by employing triallyl isocyanurate showed no crystalline or crystalline bloom, whereas those samples employed using triallyl cyanurate did show crystalline bloom. Also, it should also be appreciated that the triallyl isocyanurate was used in the neat form, and therefore the samples included more triallyl isocyanurate than triallyl cyanurate; despite the increase amount of triallyl isocyanurate, the samples did not bloom, but the samples including triallyl cyanurate did bloom. Also, it is noted that the presence of triallyl isocyanurate in those samples that employed triallyl cyanurate, or the presence of triallyl cyanurate in those samples that employed triallyl isocyanurate is believed to be caused by the isomerization of the molecules.

Samples 5-14

Due to the surprising differences in surface bloom observed in Samples 1-4 between TAC and TAIC, a second confirmatory study was pursued. Ten additional thermoplastic vulcanizates were prepared in a similar fashion to Samples 1-4. The ingredients included 100 parts by weight elastomeric copolymer, although the amounts reported in Table II reflect the total weight of the rubber stock, which included 100 parts by weight oil for Rubber I (which was the same rubber employed in Samples 1-4), and 90 parts by weight oil for Rubber II. The ingredients also included 22 parts by weight clay, 3 parts by weight antioxidant, and 6.6 parts by weight peroxide curative. The ingredients that were varied in each of the samples are set forth in Table II. It is noted that Samples 7 and 8 employed a distinct rubber (Rubber II). Table II also includes the results of analysis performed to determine the presence of crystalline bloom. It is noted that the GC/MS method was not employed to analyze samples 9-14.

Rubber II was a poly(ethylene-co-propylene-co-5-ethylidene-2-norbornene) elastomeric copolymer characterized by having a diene content of about 4.4 weight percent, a Mooney viscosity $ML_{(1+4)}$@125° C. of about 53 (oil extended), an ethylene content of about 66 weight percent, and an oil content of 90 phr. The thermoplastic resin, clay, oil, peroxide curative, and antioxidant were similar to those employed in Samples 1-4. It is noted that the coagents employed (i.e., triallylcyanurate and triallyl isocyanurate) were employed as either neat liquids or as powdered liquid concentrates. The powdered liquid concentrate of triallyl cyanurate was the same as employed in Samples 1-4 (i.e. PLC™ (TAC)-50BC), and the powdered liquid concentrate of triallyl isocyanurate was 72% active, included an amorphous silicon dioxide carrier, and was obtained under the tradename PLC™ (TAIC)-72 (Rhein Chemie). The neat triallyl cyanurate was obtained under the tradename TAC Monomer (Cylink), and the neat triallyl isocyanurate was obtained under the tradename TAIC (Nippon Kasei Chemical Co.)

TABLE II

|  | Samples | | | | | | | | | |
| --- | --- | --- | --- | --- | --- | --- | --- | --- | --- | --- |
|  | 5 | 6 | 7 | 8 | 9 | 10 | 11 | 12 | 13 | 14 |
| Rubber I (w/oil) | 200 | 200 | — | — | 200 | 200 | 200 | 200 | 200 | 200 |
| Rubber II (w/oil) | — | — | 190 | 190 | — | — | — | — | — | — |
| Additional Oil | 25 | 15 | 35 | 25 | 25 | 25 | 25 | 25 | 25 | 25 |
| Thermoplastic Resin | 56 | 61 | 56 | 61 | 56 | 56 | 56 | 56 | 56 | 56 |
| TAIC |  |  |  |  |  |  |  |  |  |  |
| Neat | 6.6 | 6.6 | 6.6 | 6.6 | — | — | — | — | — | — |
| Powdered Liquid Concentrate | — | — | — | — | 9.2 | 4.6 | — | — | — | — |
| TAC |  |  |  |  |  |  |  |  |  |  |
| Neat | — | — | — | — | — | — | 6 | 3 | — | — |
| Powdered Liquid Concentrate | — | — | — | — | — | — | — | — | 6.6 | 3.3 |
| Crystalline Bloom (visual) | No | No | No | No | No | No | Yes | Yes | Yes | Yes |
| Crystalline Bloom (GC/MS) |  |  |  |  |  |  |  |  |  |  |
| Crystalline Material (Rel. Peak Area) | <0.1 | <0.1 | <0.1 | <0.1 | — | — | — | — | — | — |
| TAC (Rel. Peak Area) | <0.1 | <0.1 | <0.1 | <0.1 | — | — | — | — | — | — |
| TAIC (Rel. Peak Area) | 8.2 | 12.9 | 19.3 | 16.0 | — | — | — | — | — | — |

The data in Table II verifies the findings shown in Table I. And, it is also noted that Sample 14 shows that crystalline bloom is a problem even at relatively low levels of triallyl cyanurate. This is in sharp contrast to the triallyl isocyanurate, which yielded no bloom, even when relatively large amounts were employed in Samples 5-8. Also, the advantageous results of the present invention are not limited by the rubber employed in preparing the thermoplastic vulcanizate inasmuch as Samples 7 and 8 employed a distinct rubber.

Various modifications and alterations that do not depart from the scope and spirit of this invention will become apparent to those skilled in the art. This invention is not to be duly limited to the illustrative embodiments set forth herein.

What is claimed is:

1. A method of preparing a thermoplastic vulcanizate comprising:
    dynamically vulcanizing poly(ethylene-co-propylene-co-5-ethylidene-2-norbornen) rubber within a blend comprising 100 parts by weight of the rubber, about 15 to about 25 parts by weight polypropylene, from about 10 to about 250 parts by weight clay or carbon black, about 70 to about 200 parts by weight of an extender oil, and a single cure system consisting of an organic peroxide cure agent and from about 1 to about 12 parts by weight triallyl isocyanurate, wherein the single cure system is the only cure system, to thereby form a thermoplastic vulcanizate;
    where said step of dynamically vulcanizing cures the rubber to an extent where not more than 10 weight percent of the rubber is extractable by cyclohexane at 23° C. and where the thermoplastic vulcanizate can be formed into an extrudate that includes less crystalline bloom than can be detected without special optical magnification after 60 days.

2. The method of claim 1, where the organic peroxide includes 2,5-dimethyl-2,5-di(t-butylperoxy)hexane.

3. The method of claim 1, where the dynamic vulcanization is effected with from about 3 to about 4 parts by weight triallyl isocyanurate per 100 parts by weight rubber.

4. The method of claim 1, where the surface of the extrudate includes less bloom than can be detected by a low-powered microscope, using oblique light, after 60 days.

5. The method of claim 1, where the surface of the extrudate includes less crystalline bloom than would otherwise an appreciable impact on the surface of the extrudate.

6. A method for preparing a thermoplastic vulcanizate, the method comprising:
    forming a thermoplastic vulcanizate by dynamically vulcanizing a rubber within a blend comprising about 56 parts by weight, polypropylene, about 125 parts by weight paraffinic oil, about 42 parts by weight clay, about 3 parts by weight antioxidant, about 6.5 parts by weight peroxide curative, and about 6.6 parts by weight triallyl isocyanurate, all based on 100 parts by weight rubber, where the rubber is a copolymer of ethylene, propylene, and vinyl norbornene, the peroxide curative is 2,5-dimethyl-2,5-di(t-butylperoxy)hexane, and the antioxidant is tetrakis(methylene 3,5-ditert-buty-4-hydroxy hydrocinnamate)methane; and
    forming a extrudate from the thermoplastic vulcanizate, where surface of the extrudate includes less bloom than can be detected by a low-powered microscope, using oblique light, after 60 days.

7. The method of claim 1, where the rubber is characterized by a diene content of about 4.4 wt. %, an oil-extended Mooney viscosity ML(1+4@125° C.) of about 53, and an ethylene content of about 66 wt. %.

8. The method of claim 7, where the triallyl isocyanurate is provided to said blend together with a carrier selected from the group consisting of silica, precipitated silica, amorphous fumed silica, fused silica, silica gel, and silicates.

9. The method of claim 8, where the carrier has a particle size of from about 100 to about 100 nm, and where the concentration of triallyl isocyanurate on the carrier is from about 25% to about 80% by weight based on the total weight of the triallyl isocyanurate and the carrier.

* * * * *